United States Patent
Hoffman et al.

(10) Patent No.: US 11,450,107 B1
(45) Date of Patent: Sep. 20, 2022

(54) DYNAMIC DETECTION AND RECOGNITION OF MEDIA SUBJECTS

(71) Applicant: Microsoft Technology Licensing, LLC, Redmond, WA (US)

(72) Inventors: Yonit Hoffman, Herzeliya (IL); Irit Ofer, Kfar Saba (IL); Avner Levi, Kiryat-Ono (IL); Haim Sabo, Petach Tiqwa (IL); Reut Amior, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/197,478

(22) Filed: Mar. 10, 2021

(51) Int. Cl.
*G06V 20/40* (2022.01)
*G06K 9/62* (2022.01)
*G06F 16/71* (2019.01)
*G06V 10/764* (2022.01)

(52) U.S. Cl.
CPC .............. *G06V 20/46* (2022.01); *G06F 16/71* (2019.01); *G06K 9/6215* (2013.01); *G06K 9/6267* (2013.01); *G06V 10/764* (2022.01); *G06V 20/41* (2022.01)

(58) Field of Classification Search
CPC ...... G06V 20/46; G06V 20/41; G06V 10/764; G06F 16/71; G06K 9/6215; G06K 9/6267
See application file for complete search history.

(56) References Cited

U.S. PATENT DOCUMENTS

| 6,441,825 B1 * | 8/2002 | Peters | G06T 13/40 345/473 |
| 6,587,574 B1 * | 7/2003 | Jeannin | G06F 16/786 345/949 |
| 7,016,540 B1 | 3/2006 | Gong et al. | |

(Continued)

FOREIGN PATENT DOCUMENTS

| CN | 101976258 A | 2/2011 |
| CN | 108564598 A | 9/2018 |

(Continued)

OTHER PUBLICATIONS

"Final Office Action Issued in U.S. Appl. No. 16/831,105", dated Dec. 3, 2021, 13 Pages.

(Continued)

*Primary Examiner* — John B Strege
(74) *Attorney, Agent, or Firm* — Holzer Patel Drennan (57) ABSTRACT

A system for indexing animated content receives detections extracted from a media file, where each one of the detections includes an image extracted from a corresponding frame of the media file that corresponds to a detected instance of an animated character. The system determines, for each of the received detections, an embedding defining a set of characteristics for the detected instance. The embedding associated with each detection is provided to a grouping engine that is configured to dynamically configure at least one grouping parameter based on a total number of the detections received. The grouping engine is also configured to sort the (Continued)

detections into groups using the grouping parameter and the embedding for each detection. A character ID is assigned to each one of the groups of detections, and the system indexes the groups of detections in a database in association with the character ID assigned to each group.

20 Claims, 5 Drawing Sheets

(56) References Cited

U.S. PATENT DOCUMENTS

| | | | |
|---|---|---|---|
| 7,460,730 | B2 | 12/2008 | Pal et al. |
| 7,920,761 | B2 | 4/2011 | Amir et al. |
| 8,111,284 | B1 | 2/2012 | Givon |
| 8,170,280 | B2 | 5/2012 | Zhao et al. |
| 8,311,344 | B2 | 11/2012 | Dunlop et al. |
| 8,805,110 | B2 | 8/2014 | Rhoads et al. |
| 9,094,615 | B2 | 7/2015 | Aman et al. |
| 9,357,242 | B2 | 5/2016 | Sinha et al. |
| 9,542,751 | B2 | 1/2017 | Mannino et al. |
| 9,754,177 | B2 | 9/2017 | Liu et al. |
| 10,043,078 | B2 * | 8/2018 | Winter ............... G06T 7/194 |
| 10,204,274 | B2 | 2/2019 | Smith et al. |
| 10,213,645 | B1 | 2/2019 | Wu et al. |
| 10,432,896 | B2 * | 10/2019 | Winter ............... H04N 7/181 |
| 10,522,186 | B2 | 12/2019 | Attorre et al. |
| 10,958,874 | B2 | 3/2021 | Astarabadi et al. |
| 2005/0196043 | A1 | 9/2005 | Jung et al. |
| 2009/0141940 | A1 | 6/2009 | Zhao et al. |
| 2012/0026174 | A1 | 2/2012 | Mckeon et al. |
| 2013/0300939 | A1 | 11/2013 | Chou et al. |
| 2017/0270180 | A1 * | 9/2017 | State ............... G06F 16/285 |
| 2018/0268255 | A1 | 9/2018 | Surazhsky et al. |
| 2018/0276696 | A1 * | 9/2018 | Kato ............... G06V 40/172 |
| 2019/0073564 | A1 | 3/2019 | Saliou |
| 2019/0236371 | A1 | 8/2019 | Boonmee et al. |
| 2019/0370551 | A1 | 12/2019 | Mao et al. |
| 2020/0226416 | A1 * | 7/2020 | Bapat ............... G08B 13/1966 |
| 2021/0056313 | A1 | 2/2021 | Nir et al. |
| 2021/0056362 | A1 | 2/2021 | Nir et al. |
| 2022/0130104 | A1 * | 4/2022 | Serry ............... G06T 3/40 |
| 2022/0157057 | A1 | 5/2022 | Nir et al. |

FOREIGN PATENT DOCUMENTS

| | | |
|---|---|---|
| CN | 110096929 A | 8/2019 |
| WO | 2017124221 A1 | 7/2017 |

OTHER PUBLICATIONS

"Preinterview First Office Action Issued in U.S. Appl. No. 16/831,353", dated Jul. 26, 2021, 4 Pages.
Somandepalli, et al., "Unsupervised Discovery Of Character Dictionaries In Animation Movies", In Journal of IEEE Transactions on Multimedia, vol. 20, Issue 3, Aug. 29, 2017, 28 Pages.
Gupta, Shubham, "Object Detection for Self-Driving Cars", Retrieved From: https://www.hackerearth.com/blog/developers/object-detection-for-self-driving-cars/, Sep. 24, 2018, 24 Pages.
"Unlock Video Insights", Retrieved From: https://vi.microsoft.com/en-us/, Retrieved Date: Aug. 7, 2019, 7 Pages.
"Visual Intelligence Made Easy", Retrieved From: https://www.customvision.ai/, Aug. 7, 2019, 2 Pages.
"Non Final Office Action Issued in U.S. Appl. No. 16/831,105", dated Jun. 18, 2021, 14 Pages.
Forczmanski, et al., "Two-Stage Approach to Extracting Visual Objects from Paper Documents", In Journal of Machine Vision and Applications, Aug. 24, 2016, pp. 1243-1257.
Grzeszick, Rene, "Partially Supervised Learning of Models for Visual Scene and Object Recognition", In Thesis of University of Dortmund, Jul. 19, 2018, 161 Pages.
Liu, et al., "Combined Key-Frame Extraction and Object-Based Video Segmentation", In Journal of IEEE Transactions on Circuits and Systems for Video Technology, vol. 15, Issue 7, Jul. 27, 2005, pp. 869-884.
Maiya, Shishira R., "DeepSORT: Deep Learning to Track Custom Objects in a Video", Retrieved From: https://web.archive.org/web/20190723141631/https:/nanonets.com/blog/object-tracking-deepsort/, Jul. 23, 2019, 22 Pages.
Misra, et al., "Watch and Learn: Semi-Supervised Learning of Object Detectors from Videos", In Proceedings of the IEEE Conference on Computer Vision and Pattern Recognition, Jun. 7, 2015, pp. 3593-3602.
Papadopoulos, et al., "We Don't Need No Bounding-Boxes: Training Object Class Detectors Using Only Human Verification", In Proceedings of the IEEE Conference on Computer Vision and Pattern Recognition, Jun. 27, 2016, 10 Pages.
"International Search Report and Written Opinion Issued in PCT Application No. PCT/US20/038004", dated Sep. 29, 2020, 11 Pages.
"International Search Report and Written Opinion Issued in PCT Application No. PCT/US2020/037695", dated Nov. 2, 2020, 14 Pages.
Redmon, et al., "You Only Look Once: Unified, Real-Time Object Detection", In Journal of Computing Research Repository, Jun. 11, 2015, 9 Pages.
Roth, et al., "How to Improve your Classifier", Retrieved From: https://docs.microsoft.com/en-us/azure/cognitive-services/custom-vision-service/getting-started-improving-your-classifier, Mar. 21, 2019, 8 Pages.
Tang, et al., "Large Scale Semi-Supervised Object Detection using Visual and Semantic Knowledge Transfer", In Proceedings of the Computer Vision and Pattern Recognition, Jun. 27, 2016, pp. 2119-2128.
Tapu, et al., "DEEP-SEE: Joint Object Detection, Tracking and Recognition with Application to Visually Impaired Navigational Assistance", In Journal of Sensors, vol. 17, Issue 11, Oct. 28, 2017, 24 Pages.
Weng, Lilian, "Object Detection Part 4: Fast Detection Models", Retrieved From: https://lilianweng.github.io/lil-log/2018/12/27/object-detection-part-4.html, Dec. 27, 2018, 27 Pages.
Yu, et al., "On Combining Multiple Features for Cartoon Character Retrieval and Clip Synthesis", In Journal of IEEE Transactions on Systems, Man, and Cybernetics, Part B (Cybernetics), vol. 42, Issue 5, Oct. 2012, pp. 1413-1427.
U.S. Publication No. 2022/0157057, filed May 19, 2022.
U.S. Pat. No. 11,366,989, filed Jun. 21, 2022.

* cited by examiner

DYNAMIC DETECTION AND RECOGNITION OF MEDIA SUBJECTS

BACKGROUND

The rise of cloud storage platforms has led to the development of massive cloud-based video databases. The demand for video indexing and searching tools is higher than ever, but video indexing efforts are complicated by the diverse nature of video data hosted on such platforms and, in some cases, a lack of basic information about the format and nature of video content being stored. Animated videos, for example, typically contain very limited metadata and, therefore, efficient search and retrieval of specific content is not always possible. The ability to index characters in an animated video is desirable to improve searchability of animated content.

Yet, animated videos present unique challenges. Unlike live action media often indexed by image recognition software that may be trained to recognize people (even specific faces of actors), animated characters make take on an infinite number of nontraditional forms such as that of a talking fork, teddy bear, etc. Animated characters move differently than human actors and even stationary animated objects (e.g., tree, cloud, sun) may appear different enough from real-life counterparts to evade accurate recognition by existing artificial intelligence. For these reasons, existing indexing solutions are inadequate for animated media.

SUMMARY

According to one implementation, a disclosed system includes a character indexing engine that performs operations for indexing animated media content in association with characters that appear within the animated media content. The character indexing engine receives detections extracted from a media file, where each one of the detections corresponds to a detected instance of a character. For each one of the received detections, the character indexing engine determines an embedding defining a vector with dimensions representing characteristics for the detected instance. The character indexing engine further provides the embedding to a grouping engine that is configured to both dynamically select at least one grouping parameter based on a total number of detections received for the media file and to sort the detections into groups using the grouping parameter and the embeddings. The character indexing engine assigns a character ID to one or more of the groups of detections and indexes the groups of detections in a database in association with the character ID assigned to each of the groups.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

In many cases, content producers, e.g., companies generating or manipulating animated media content, would like to index the characters included in their animated media content. In some cases, this is performed by manually annotating each character in every frame of a multi-frame animated media file. Although automated solutions exist, most do not work well on animated content due, largely in part, to the unorthodox shapes, sizes, and forms of animated characters.

The technology described herein is directed to a media indexer including a character recognition engine that can automatically detect and group instances (or occurrences) of characters in a multi-frame animated media file such that each group contains images associated with a single character. The character groups themselves are then labeled automatically (e.g., with a specific character ID) by a trained classifier, which may be a previously-trained classifier or a classifier that is trained based on the labeled character groups of detections received as input.

Various aspects of the disclosed process provide for more consistent and accurate indexing than other automated approaches due, in part, to adaptations to traditional methodologies that are specifically tuned to address the unique challenges presented by animated content. One such challenge relates to grouping—e.g., recognizing multiple instances of a character as, in fact, being the same character. Some existing grouping solutions perform this grouping by translating instances of animated characters into complex vectors (embeddings) that are then compared to one another. This complex vector comparison is processing-intensive and due to sheer complexity, is usually fraught by errors.

Further, most existing grouping (clustering) algorithms typically require a fixed number of groups and/or a 'minimum group size' as an input, and these static parameters tend to work well for either short or long videos, but not both. According to one implementation, a grouping technique disclosed herein provides for dynamic (video-specific) selection of one or more grouping parameters based on characteristics of the video such as the length of the video, number of frames, number of frames with characters detected, etc.

Another problem with clustering algorithms is that the constraints needed to ensure sufficient algorithmic accuracy typically result in a high number of "rejected" detections that cannot be matched with any other like-detections (and therefore, that are excluded from the indexing process). A herein-disclosed character grouping engine increases the number of character instances that can be successfully grouped (e.g., where each group consists of instances of the same character) without decreasing the accuracy of group assignment and recognition. In one implementation, this is achieved by employing primary and secondary grouping algorithms, in series, that apply different techniques. The primary grouping algorithm establishes initial groups with a high level of recognition accuracy (e.g., by employing somewhat rigid grouping constraints) while a secondary grouping algorithm employs more relaxed grouping constraints to expand the established groups with the addition of a threshold percentage of the rejected images.

Still further disclosed techniques that yield meaningful performance advantages pertain to a herein disclosed methodology for indexing each group. Rather than relying on manual input or single-image recognition, the disclosed technique utilizes a "majority voting" approach that helps to ensure that a character ID assigned to an established group is significantly less likely to be erroneous (e.g., the product of recognition error).

These, and other advantages, will be explored and discussed in detail with respect to the following figures.

As used herein, the term "animated character" refers to an object that exhibits human-like traits contained or detected in an animated multi-frame animated media file. For example, an "animated character" can be an animate or inanimate anthropomorphic object that exhibits any human form or attribute including, but not limited to, a human trait, emotion, intention, etc. The term "detections" is used herein to refer to detected instances of animated characters. Initially, each detection is unidentified. In a given media file, there may exist many detections corresponding to each of multiple different characters. Through the utilization of a character grouping engine and a character recognition engine (discussed below), unidentified detections may be identified as particular character(s) and appropriately indexed.

The embodiments and implementations described herein are primarily discussed with reference to a media indexer including a character recognition engine that can automatically detect and group instances (or occurrences) of characters in a multi-frame animated media file such that each group contains images associated with a single character. It is appreciated that the characters can alternatively or additionally be objects or context regions and the multi-frame animated media files can be any media content including real-time image content. That is, the embodiments and implementations described herein can be directed to any type of customized object or region detection and classification. In any case, the classified groups, e.g., character groups, are then labeled and the labeled groups are used to train an image classification model for automatically classifying the customized objects, regions, animated character, etc., in subsequent multi-frame media files.

Figure 1:
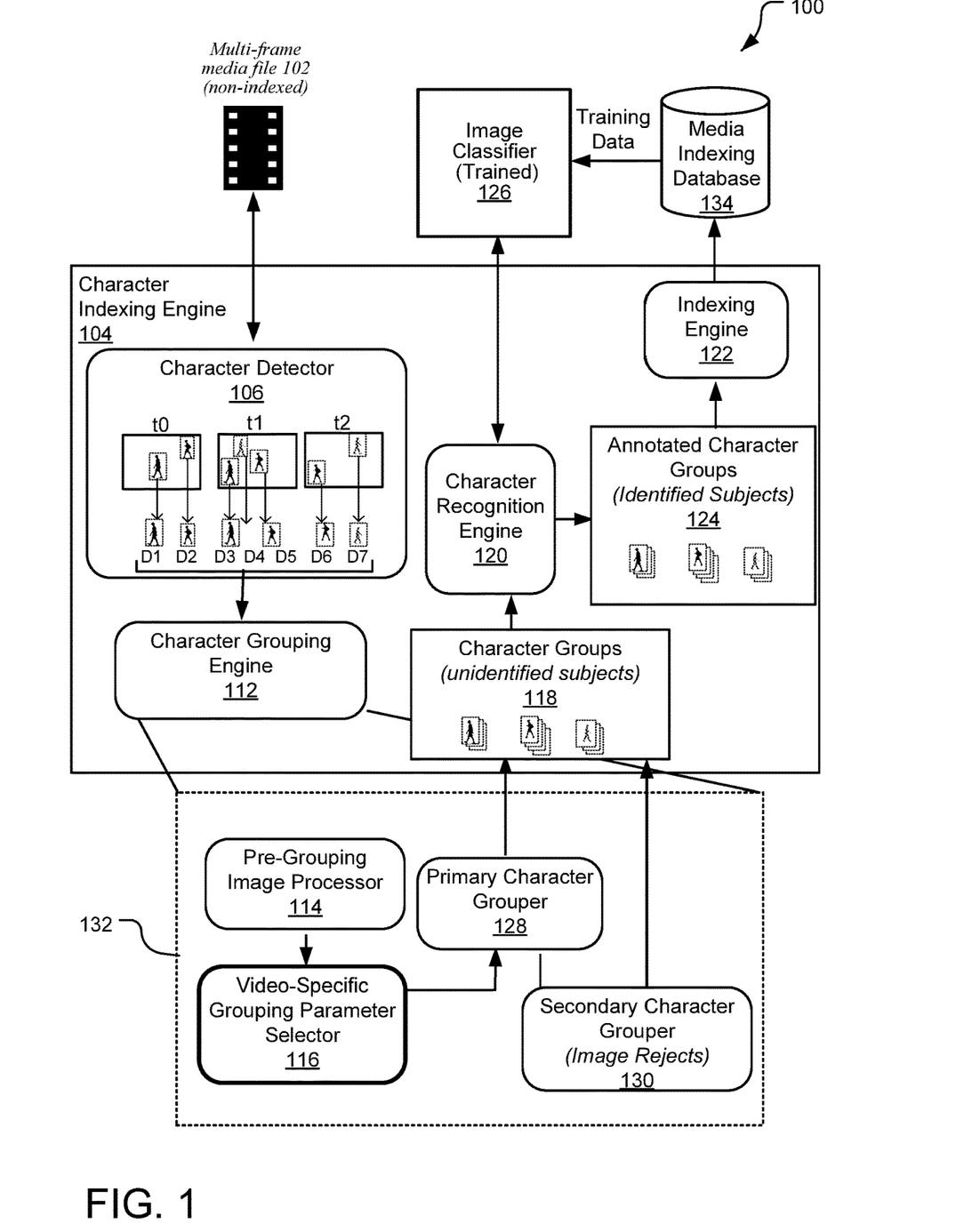
FIG. 1 illustrates an example system for indexing animated content.

FIG. 1 illustrates an example system 100 for indexing animated content. The system 100 includes a character indexing engine 104 that receives as input a multi-frame media file 102, which may be understood as including a series of time-separated frames. The character indexing engine 104 includes several sub-modules including a character detector 106 that performs operations of character detection, a character grouping engine 112 that creates groups of similar detections (e.g., when executed perfectly, each group may consist of detections of a same, single character), a character recognition engine 120 that assigns character identifiers to each group, and an indexing engine 122 that indexes the resulting content.

Some implementations of the character indexing engine 104 may include less than all of the modules shown in FIG. 1, other modules in lieu of one or more illustrated modules, or still other module in addition to the illustrated modules. Although the character indexing engine 104 may be implemented in a single computing device, the software components of its associated modules may, in some implementations, be distributed for storage and/or execution across multiple devices and/or multiple different processing nodes of a cloud-based network.

Upon receipt of the frames of the multi-frame media file 102, the character detector 106 performs image recognition to detect all characters satisfying some predefined criteria that appear in each individual one of the frames. The initial identification of each character (e.g., each "detection") may, in different implementations, be performed in different ways such as using various techniques that are assumed to be outside the scope of this disclosure.

The character detector 106 detects (e.g., crops) a set of sub-images (e.g., D1-D7) from the frames of the multi-frame media file 102, where each sub-image individually includes a corresponding one of the detections. Thus, the sub-images (D1-D7) are also referred to in the following description as the "detections." In the illustrated implementation, the object detector 106 accomplishes this by defining a bounding box around each detection and extracting the sub-images D1-D7, which each consist of the pixels internal to one of the bounding boxes. In the illustrated example, the character detector 106 detects seven different instances of characters across the three exemplary frames illustrated. Although multiple of these seven different detections may, in actuality, correspond to a same character, the character detector 106 does not perform operations for target identification or clustering.

In one implementation, the character detector 106 creates an embedding for each character, which is a numerical vector representation of the character. In one implementation, the character detector 106 computes a confidence value for each detection representing a confidence that the detection does, in fact, contain an animated character. Low-confidence detections (with confidence values below a threshold) may be filtered (thrown away). In one implementation, the character detector 106 filters 40% of the detections with the lowest confidence. This threshold is, in one implementation, representative of a tested threshold that filters out enough non-characters to ensure a meaningful result while not incidentally throwing away too many true characters to guarantee the meaningful result. The character detector 106 provides the embeddings (vector representations) and/or the associated detections (e.g., the extracted sub-images) to a character grouping engine 112.

The character grouping engine 112 performs operations for grouping the detections into subsets of like-character groups. For example, each group includes all images of a same and single animated character that are associated with multiple different frames of the multi-frame media file 102. The character grouping engine 112 includes a number of sub-components shown in expanded view 132, some of which are discussed in further detail with respect to other figure herein. A pre-grouping image processor 114 performs various operations for image processing that may vary in different implementations. In one implementation, the pre-grouping image processor performs a dimensionality reduction to reduce the size of the embedding received in association within detection.

The character grouping engine 112 may also include a video-specific grouping parameter selector 116 that selects parameters used by a primary character grouper 128 to sort the detections into groups. For example, the video-specific grouping parameters selector 116 selects parameters for a grouping algorithm based on characteristics such as the length of the multi-frame media file 102, the number of frames within the multi-frame media file 102 that contain animated characters, or the total number of detections. In one implementation, this video-specific parameter selection effectively tunes a clustering algorithm to provide a solution that provides the best trade-off, in light of the true number of characters and/or detections, between over-representation and under-representation of characters. This benefit is discussed further below with respect to FIG. 2.

Chosen parameters, the detections (e.g., D1-D7), and/or other associated information are provided to a primary character grouper 128, which applies a clustering algorithm that attempts to sort the detections into different character groups 118. When the clustering algorithm is applied perfectly without error, each of the different character groups 118 consists of detections corresponding to a same animated character. In different implementations, the primary character grouper 128 may apply different types of clustering algorithms readily known and available in the art.

Notably, many clustering algorithms apply some type of filtering mechanism that discards images than cannot, with acceptable confidence, be matched with the images of any particular group. If, for example, the algorithm requires a 30% grouping confidence, this implies that a given detection is discarded if the image cannot, with at least 30% confidence, be matched with other images in an existing group. While this may improve the overall accuracy of the image matching performed by the primary character grouper 128, selectively throwing away images also can have the undesirable effect of reducing the indexability of a video. For example, the character indexing engine 104 may be incapable of indexing a particular frame according to characters present in the frame and/or the character indexing engine 104 may completely fail to identify certain characters whose associated detections were thrown away due to low confidence.

It has been shown through experimental data that the performance of the character indexing engine 104 is improved when a secondary character grouper 130 is used in sequence with the primary character grouper 128. The primary character grouper 128 applies a clustering algorithm and discards detections that cannot be clustered with other images with a threshold degree of confidence. The secondary character grouper 130, in contrast, expands (grows) the character groups 118 created by the primary character grouper 128 by selectively adding back in to the resulting group(s) some of the detections that were thrown away by the primary character grouper 128. That is, the secondary character grouper 130 examines the detections rejected by the primary character grouper 128, and selectively adds a subset of these rejected detections into the generated groups. For example, the secondary character grouper 130 may selected a subset of the rejected detections with highest confidence matches (e.g., top 10% or other threshold) and selectively add those rejected detections back into the groups to which they are most closely related. Exemplary algorithmic details for such logic are discussed in greater detail with respect to FIG. 2.

The character groups 118 are provided to a character recognition engine 120. The character recognition engine, 120, in turn, utilizes an image classifier 126 to assign a character ID to each of the character groups 118. The image classifier 126 is, for example, a machine learning model that is trained (e.g., using a supervised learning approach) to associate imagery with character IDs that have been previously indexed in a media indexing database 134. In one implementation, the image classifier 126 accepts as input one detection at a time and returns a character ID and a confidence metric indicating a level of confidence that the detection includes a character that is identified by the character ID.

The character recognition engine 120 may utilize the image classifier 126 in different ways within different implementations of the technology. In one implementation, the character recognition engine 120 provides the image classifier with a single image representative of each of the character groups 118 and uses the character ID output of the image classifier 126 to index the entire group. In another implementation, the character recognition engine 120 employs a "majority voting" scheme in in which a sampling of images from each of the character groups 118 are provided to the image classifier 126. If a majority of the sampled images are associated by the image classifier 126 with a same character ID and at least a threshold degree of confidence, the group is indexed in association with the character ID; otherwise, the group remains unassigned. This methodology is discussed in further detail below with respect to FIG. 3.

After the character recognition engine 120 has analyzed the unidentified groups and associated a character ID with the character groups 118 that can be identified with the threshold degree of confidence, a set of resulting annotated character groups 124 is provided to an indexing engine 122, which in turn indexes both the detections and the associated video frames in the media indexing database 134 in association with the corresponding assigned character ID. As mentioned above, the particular methodologies employed by the character grouping engine 112 (e.g., the use of primary and secondary character groupers and/or the video-specific selection of grouping parameters) and the character recognition engine (e.g., majority voting approach) lend to much higher performance by the character indexing engine 104 than that attainable with other currently-existing indexing solutions.

Figure 2:
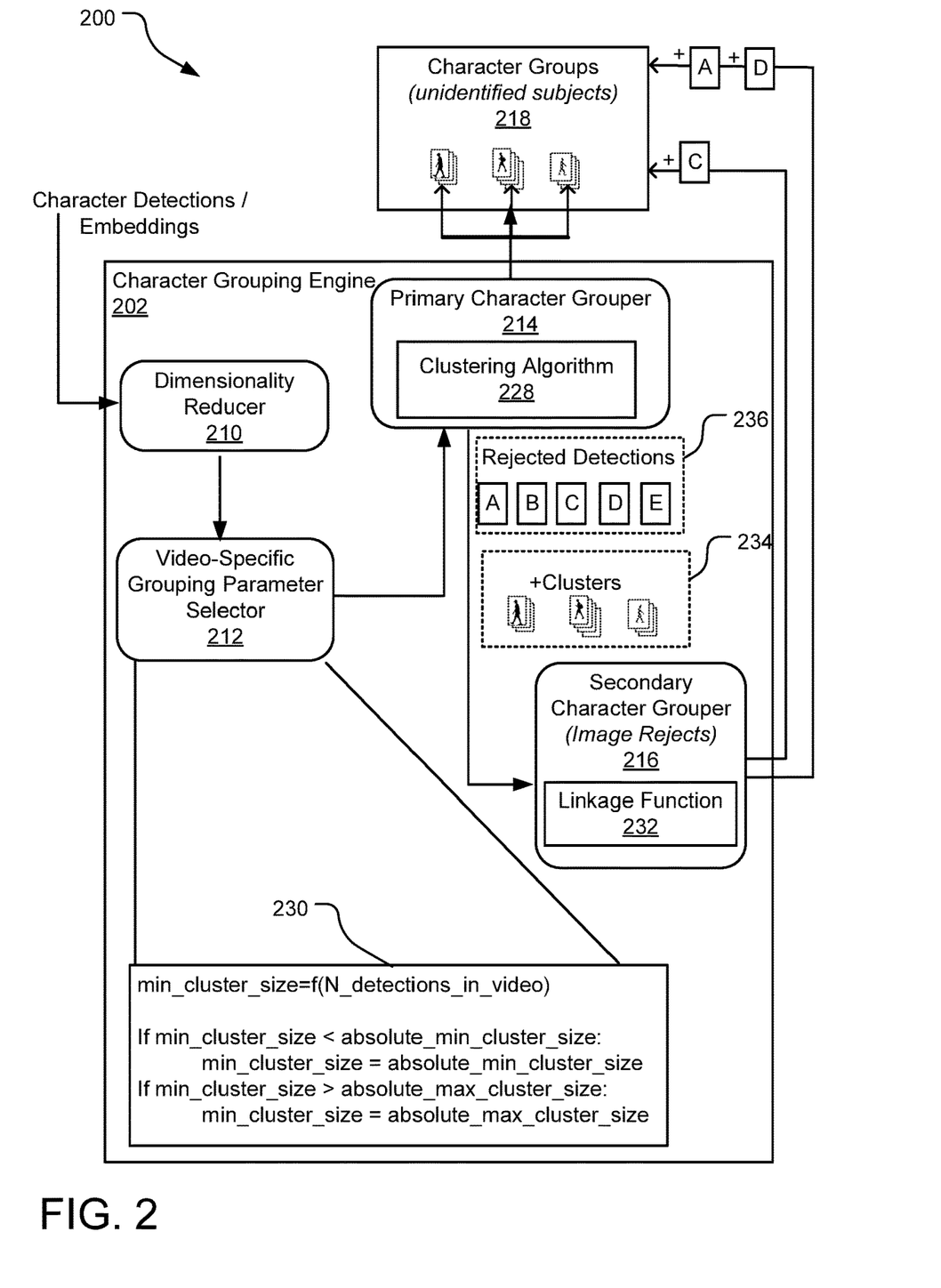
FIG. 2 illustrates aspects of another example system for indexing animated content.

FIG. 2 illustrates aspects of another example system 200 for indexing animated content. In FIG. 2, specific focus is given to the character grouping engine 202 which may perform functionality the same or similar to that described with respect to the character grouping engine 112 of FIG. 1. The character grouping engine 202 receives character "detections," or sub-images, that have been cropped from frames of a video. Each of the detections includes imagery that has been previously-identified as including animated character.

In one implementation, the character grouping engine 202 is provided with an image embedding that has been created for each character detection. Image embedding is the result of mapping a data of a high dimension (e.g., an array that corresponds to the size of the bounding box) to a lower dimensional representation (e.g., a long vector). In this lower dimensional representation, each value may, for example, indicates a weight that corresponds to one or more filters of a CNN. Thus, each value in the image embedding is a numerical characterization of certain feature(s) contained in the image.

Image embeddings for animated characters are typically very long. For example, an image embedding may be vector of 512 dimensions. Due to mathematical complexity, clustering algorithms do not typically work well when used to compare these types of image embeddings to one another and/or to identify whether different animated images depict different instances of a same character. For this reason, the character grouping engine 202 includes a dimensionality reducer 210 that applies a dimensionality reduction technique on each received embedding to reduce the amount of information used by the clustering algorithm 228. In one implementation, the dimensionality reducer applies a Principle Component Analysis (PCA). PCA is a process that is applied on a group of vectors (embeddings) to create a shorter representation of each vector and, at the same time, capture as much variance as possible between the different vectors. This process includes creating principal components that best describe the original vectors. The principal components are orthogonal to one another and linearly uncorrelated. The original vectors are then projected to a number of the principal components, resulting in a shorter dimension for the original vectors. For example, PCA may be effective to reduce the size of each embedding from 512 to 30 while keeping the majority of information the embeddings. Notably, the system 500 may forgo dimensionality reduction in some implementations, such as when fewer than a threshold number of detections are identified (e.g., scenarios where image processing is already simplified due to a limited data set size).

Following the dimensionality reduction, a video-specific grouping parameter selector 212 selects parameters for a grouping algorithm based on one or more characteristics of the video that the detections are extracted from. For instance, the video-specific grouping parameter selector 212 may perform this selection based on the number of detections received for a given video and/or based on the size of the video.

Most clustering algorithms tend to require a static input specifying either a number of total groups in which to sort a set of inputs or a minimum size of each group. If a clustering algorithm 228 is given permission to create small groups with a set of input detections, the algorithm is likely to find irrelevant characters, such as one or more characters that appear in the background of a scene but is not a speaking character and/or in a key or supporting character of the video. In addition to finding irrelevant characters, a small minimum group size may cause the clustering algorithm 228 to create multiple different groups that each contain a set of instances of a same character. For example, if an animation is an hour long and the clustering algorithm 228 uses a minimum group size of "6" (e.g., 6 total detections for a character in order to classify the character), the algorithm is likely to put different instances of the same character (e.g., "Dora the Explorer®") into multiple different groups, where each group includes a subset of images that are deemed "nearest" or most similar to that particular group. For a medium to large size video, this can result in significant extra processing (e.g., inefficiencies due to execution latencies) and/or incorrect indexing. For these reasons, clustering algorithms perform better on larger videos when the minimum group size is capped to at or above a threshold level.

Notably, a high threshold for the "minimum group size" parameter that works well for larger videos has the reverse effect on smaller/shorter videos that are, for example, a few minutes in length. If the minimum group size for these short video is set too high (e.g., requiring more images to satisfy the "minimum group size" parameter and form a group), some of the key characters in a shorter video may be lost entirely.

In one implementation, the video-specific grouping parameter selector 212 balances the above tradeoff by dynamically selecting a minimum group size, referred to in FIG. 2 as "min_cluster_size," based on the total size of the video (e.g., total number of frames in video, if received as an input) or, alternatively, based on the total number of detections for the video which may serve to indirectly indicate video size. This parameter is utilized by the clustering algorithm 228 as a prerequisite to establishing a "group" of like-detections—e.g., a group is not created by the algorithm unless there exist a number of detections greater than or equal to the min_cluster_size that satisfy a similarity measure with respect to one another.

By example and without limitation, FIG. 2 illustrates exemplary pseudocode 230 that the video-specific grouping parameter selector 212 may use when dynamically selecting the above-mentioned minimum group size parameter. Here, the minimum group size "min_cluster_size" is initialed as a function of the number of detections in the video. For example, the min_cluster_size may be initialized as:

min_cluster_size=integer(num_images/100)

or other suitable expression such that the minimum cluster size increases in proportion to the number of detections "num_images" detected in the video. The pseudocode 230 further provides for (1) re-initializing the minimum cluster size ("min_cluster_size") to a predefined minimum value when the originally-initialized value is less than the predefined minimum; and (2) re-initializing the minimum cluster size ("min_cluster_size") to a predefined maximum value when the originally-initialized value is greater than the predefined maximum value. Effectively, the pseudocode 230 provides for dynamic variation of the minimum group size variable that increases in proportion to the number of detections while remaining fixed between defined lower and upper bounds. The fixed, defined lower and upper bounds may vary from one implementation to another; however, in one implementation, the "absolute_min_cluster_size" is 4 while the "absolute_max_cluster_size" is 8

In different implementations, the primary character grouper 214 may employ different types of cluster algorithms. In one implementation, an OPTICS grouping algorithm is used (where OPTICS stands for "ordering points to identify the clustering structure). The OPTICS grouping algorithm employs clustering logic to self-determine a number of groups in which to sort the detections based on the similarities between the associated embeddings, where each group is required to have at least a number of detections that equals or exceeds the min_cluster_size.

Throughout execution the clustering algorithm 228 on the received detections according to the dynamically-size grouping parameter(s) (e.g., the minimum group size parameter), the clustering algorithm 228 sorts the detections into a set of groups, where the detections within each group satisfy a predefined similarity measure with respect to one another. The primary character grouper 214 outputs a set of clusters 234 formed via the above-described process.

In cases where the clustering algorithm 228 determines that a particular detection does not satisfy the similarity metric with respect to any other detections and/or with enough images to satisfy the minimum group size, the detection may be temporarily discarded and not placed into any of the resulting groups. FIG. 2 labels these discarded detections as "rejected detections 236." To significantly improve the performance of the character grouping engine 202, a secondary character grouper 216 performs an analysis on the rejected detections 236 that entails calculation of a dissimilarity measure for each the rejected detections with respect to each one of the groups, where the dissimilarity measure quantifies a mathematical separation between the embedding of each of the rejected detections 236 and one or more of the embeddings associated with the group for which the dissimilarity measure is computed. Of these dissimilarity measures computed, a minimum separation is then identified for each one of the rejected detections 236, where the minimum separation represents a distance between the rejected detection and a closest one of the clusters 234.

The secondary character grouper 216 identifies a subset of the rejected detections 236 for which the minimum separation satisfies a proximity condition. For example, the secondary character grouper 216 may identify a subset of the rejected detections 236 for which the computed minimum separation represents a top 10% of all minimum separations computed with respect the rejected detections 235. After identifying this subset, the secondary character grouper 216 expands the clusters 234 by adding back in the identified subset of rejected detections 236.

In one implementation, the foregoing is accomplished by calculating a distance (e.g., a Euclidean separation) between each image in the rejected detections 236 and each one of the clusters 234 generated by the primary character grouper. In one implementation where the primary character grouper 214 employs an OPTICS ("ordering points to identify the clustering structure") grouping algorithm, the secondary character grouper 216 uses a linkage function 232 to calculate the distance between each of the rejected detections 236 and each of the clusters 234. For each of "j" number of rejected detections 236, the linkage function 232 defines a distance between the rejected detection and each cluster (C), where the distance is, for example, given by:

$$\text{Distance}(C,j) = \text{Min}(\text{Distance}(i,j)) \text{ for all images in Cluster } C$$

In the above-described implementations, the character grouper 216 defines a minimum distances for each of the rejected detections 236 as the minimum distance between the detection and its closest cluster. The secondary character grouper 216 identities a subset of the rejected detections 236 for which the corresponding computed minimum distance satisfies a proximity condition. For example, the secondary character grouper 216 may identify 10% of the images that have the overall smallest computed minimum distance value with respect to any one of the clusters 234. These detections are then selectively added back into the closest respective cluster group (e.g., the "C" associated with the computed minimum distance) within the clusters 234. The use of the secondary character grouper 216 to expand the size of the clusters 234 created by a primary character grouper 214 (e.g., a clustering algorithm) provides for indexing of a significantly higher number of frames (e.g., 10% or more, depending on the threshold utilized by the secondary character grouper 216) than that achieved by the use of the clustering algorithm 228 in isolation. This expands the breadth of indexed information (e.g., number of indexed detections) while also mitigating errors introduced by such expansion.

The primary character grouper 214 outputs character groups 218. The number of character groups generated depends upon the choice of the clustering algorithms 228 employed by the primary character grouper 214 as well as the setpoint of the minimum group size ("min_cluster_size"), as discussed above. At this point in the indexing process, each of the character groups 218 includes detections satisfying similarity criteria (e.g., the detections have a high likelihood of being of a same character); however, the character associated with each group has not yet been identified. Further exemplary operations in this or an alternate indexing process are described with respect to FIG. 3 below.

Figure 3:
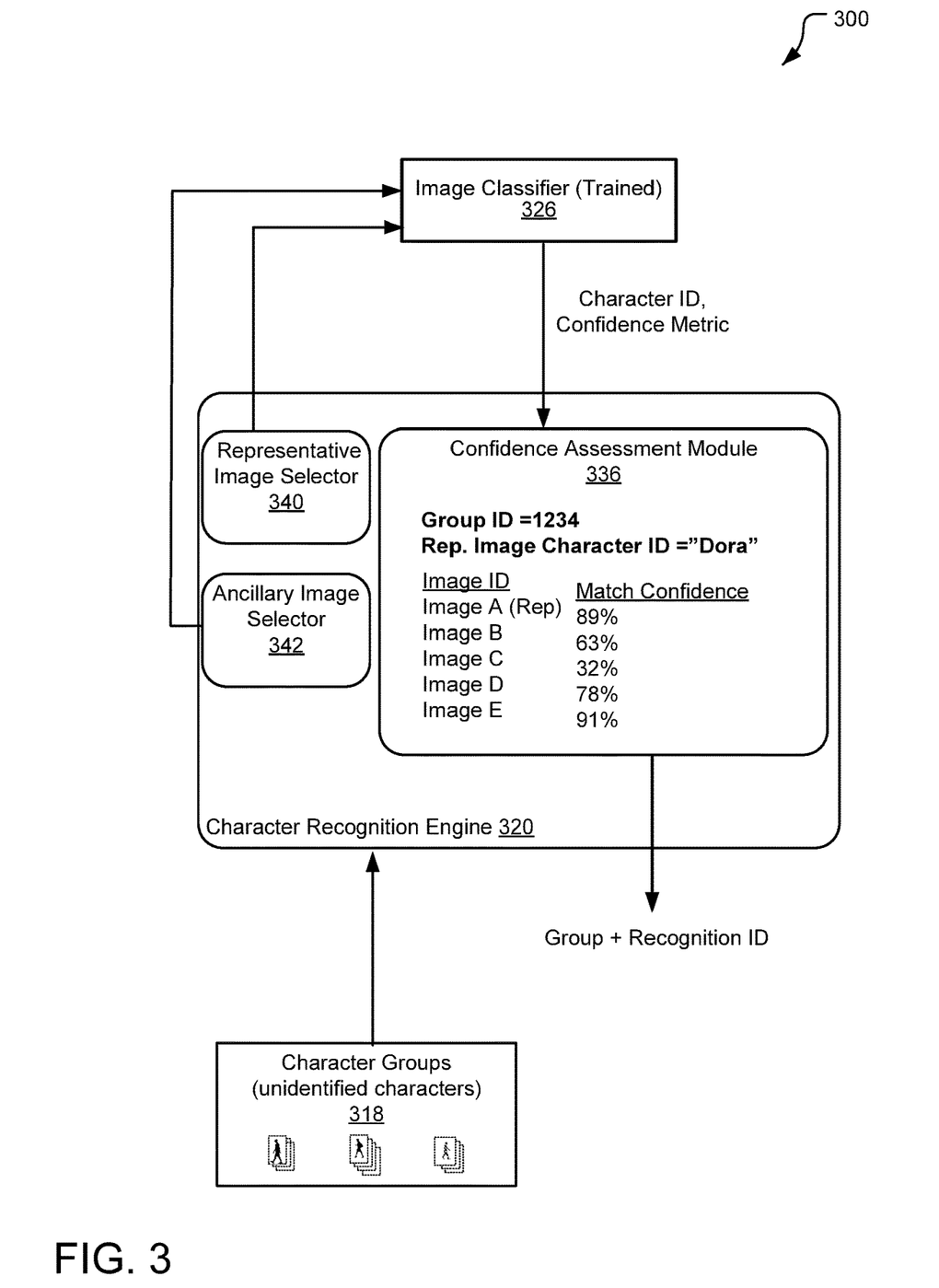
FIG. 3 illustrates aspects of still another example system for indexing animated content.

FIG. 3 illustrates aspects of another example system 300 for indexing animated content. In FIG. 3, specific focus is given to a character recognition engine 320 which may perform functionality the same or similar to that described with respect to the character recognition engine 120 of FIG. 1. The character recognition engine 320 utilizes an image classifier 326 to assign a character ID to each of multiple character groups 318. The character groups 318 are, for example, groups of character detections (e.g., where each group includes instances of a same character) that are sorted/formed by a character grouping engine, such as that described above with respect to FIG. 2.

The image classifier 326 is, for example, a machine learning model that is trained to associate imagery with character IDs. In one implementation, the image classifier 326 accepts as input one detection at a time and returns a character ID and a confidence metric. The character ID represents a "most likely" match between the detection and the list of character IDs that the image classifier 326 is trained to recognize. The confidence match indicates a level of confidence (e.g., 60% confidence) that the detection includes a character that is, in fact, accurately identified by the character ID.

In some implementations, the character recognition engine 320 provides the image classifier 326 with a single representative image from each one of the character groups 318 and uses the classifier output associated with the representative image to classify the associated group in association with a character ID. However, this methodology can be error prone, especially if the image selected is not the best representation of the character (e.g., the character is not easily identified and/or certain signature features are not discernible due to character positioning, character action, character expression, etc.) Thus, in the system of FIG. 3, the character recognition engine 320 employs a methodology that ensures higher-accuracy character recognition without significantly increasing the demand on computational resources.

The foregoing is achieved by using two sub-modules to select a set of representative images from each one of the character groups 318. A representative image selector 340 selects one representative image from each of the character groups 318. In different implementations, the representative group image may be selected using a variety of suitable techniques that help to ensure that the representative image includes features (e.g., character features) that are most representative of the associated character. In one approach, the representative image is selected to be the image with a minimum "reachability value," where the reachability value is computed by an OPTICS grouping algorithm that sorts the detections into the character groups 318. The reachability value is, for example, a distance between a core point of a defined cluster and the point (graphical location of the embedding). The embedding corresponding to the minimum reachability value within each of the character groups 318 (clusters) is chosen as the representative image for that group.

An ancillary image selector 342 selects a subset of ancillary images from each group. The subset is, in one implementation, of a predefined functional value (e.g., a value related to or based on the size of the group) and selected by any suitable means including random selection. For each one of the character groups 318, the image classifier 326 is provided with the selected representative image, and the selected set of ancillary images. For each of these images, the image classifier returns a character ID and a confidence metric, as described above. These outputs are provided to a confidence assessment module 336 within the character recognition engine 320.

The confidence assessment module 336 performs a set of recognition operations that collectively serve to associate each one of the character groups 318 with a single, identified character ID. In one implementation, the confidence assessment module 336 assigns a character ID to each one of the character groups 318 responsive to determining that a threshold percentage of the images sampled and analyzed from each group have been "matched" with a same character according to a confidence value in excess of a set threshold.

For example, in FIG. 3, the confidence assessment module 336 is shown assessing outputs from the image classifier 326 with respect to five images (A-E) that are sampled from a same character group (e.g., a group identified initially with a group ID, "1234," per the methodology described above. Here, the image classifier 326 has identified the representative image (Image A) as including a character "Dora" (e.g., from the animated TV show "Dora the Explorer") with a confidence metric ("match confidence") of 89%. This match is referred to below as the "representative image character ID." In scenarios where the image classifier 326 is unable to match the representative image (e.g., Image A) to a character ID with satisfactory confidence, the character recognition engine 320 may decline to assign a recognition ID to the group from which the representative image was selected. For example the following pseudocode may define the criteria for assigning a representative image character ID ($R_i$) to a representative image (i):

recognition of image $i=R_i$ if confidence $(R_i)≥$Count-Threshold, else None.

Continuing the example of FIG. 3, the confidence assessment module 336 determines whether there exists an "agreement" between a predefined number of the ancillary images, B-E, and the representative image. In the following example, an "agreement" is said to occur when a threshold number of the ancillary images are matched to the representative image character ID (e.g., "Dora") with confidence metric that satisfies a predefined confidence standard. In the example of FIG. 3, the character recognition engine 320 determines that an "agreement" occurs when 3 of the 4 ancillary images (B, C, D, and E) match the representative image character ID with a confidence metric exceeding a 60% confidence standard.

Thus, in the illustrated case where images B, C, D, and E match the representative image character ID with confidence metrics of 63%, 32%, 78%, and 91%, respectively, an "agreement" is said to occur based on the sufficiently high confidence metrics of images B, D, and E (three of the four ancillary images). In this case, the confidence assessment module 336 sets a "recognition ID" for the associated group to equal the representative image character ID (e.g., "Dora"). This recognition ID is therefore used in subsequent indexing operations to index each frame of the associated character group such that the frame can be retrieved responsive to a user query that includes or is based on the associated recognition ID.

In the above example, the threshold number of same-group images needed to establish an agreement is given, by example and without limitation, as "3/4" (or 75% of the ancillary images provided to the image classifier 326). In different implementations, this threshold number may vary considerably. In one implementation, the confidence assessment module 226 applies a "majority voting approach" and requires that a majority of the ancillary images sampled for a group be in agreement with the representative image character ID to assign a recognition ID to the group. If, for example, there are 7 images in the entire character group (a representative image+six ancillary images), the character recognition algorithm may, in this case, consider an "agreement" (affirmative group recognition) when a majority of the ancillary images (e.g., four of the six) are matched to the representative image character ID with a confidence that satisfies the predefined confidence standard.

Rather than require a majority of the ancillary images to be in agreement for assignment of the recognition ID to a group, still other implementations require an agreement between an alternate, dynamically-selected subset of images. For example, a requisite number of ancillary images needed to establish the "agreement" may be set to a first threshold (e.g., 3) for larger groups (e.g., groups that have five or more total images) and the number of ancillary images needed to establish the "agreement" may be set to a second different threshold when the group size is small and/or similar to the first threshold. In one implementation where each group has five or more images, the first threshold is 3 (e.g., to establish "agreement") and a select number of ancillary images (e.g., greater than 3) are input to the character recognition algorithm for each group. In the same or another implementation where each group has fewer than 5 total images, the second threshold is "size of the group minus 2". In this latter case, all images in the group may be provided as input to the character recognition algorithm. This approach (e.g., majority vote) guarantees a sufficiently high match certainty for recognition ID assignments to larger groups while also providing a flexibility that ensures that smaller groups are not precluded from recognition by virtue of group size alone.

Collectively, the implementations described above with respect to FIG. 3 all provide for some type of consensus "vote" as prerequisite for group recognition. This "vote" is performed using the outputs from the image classifier 326 for the ancillary images selected from each one of the character groups 318. This approach guarantees a higher degree of accuracy than alternative approaches that perform group recognition based on classifications of singular images.

Figure 4:
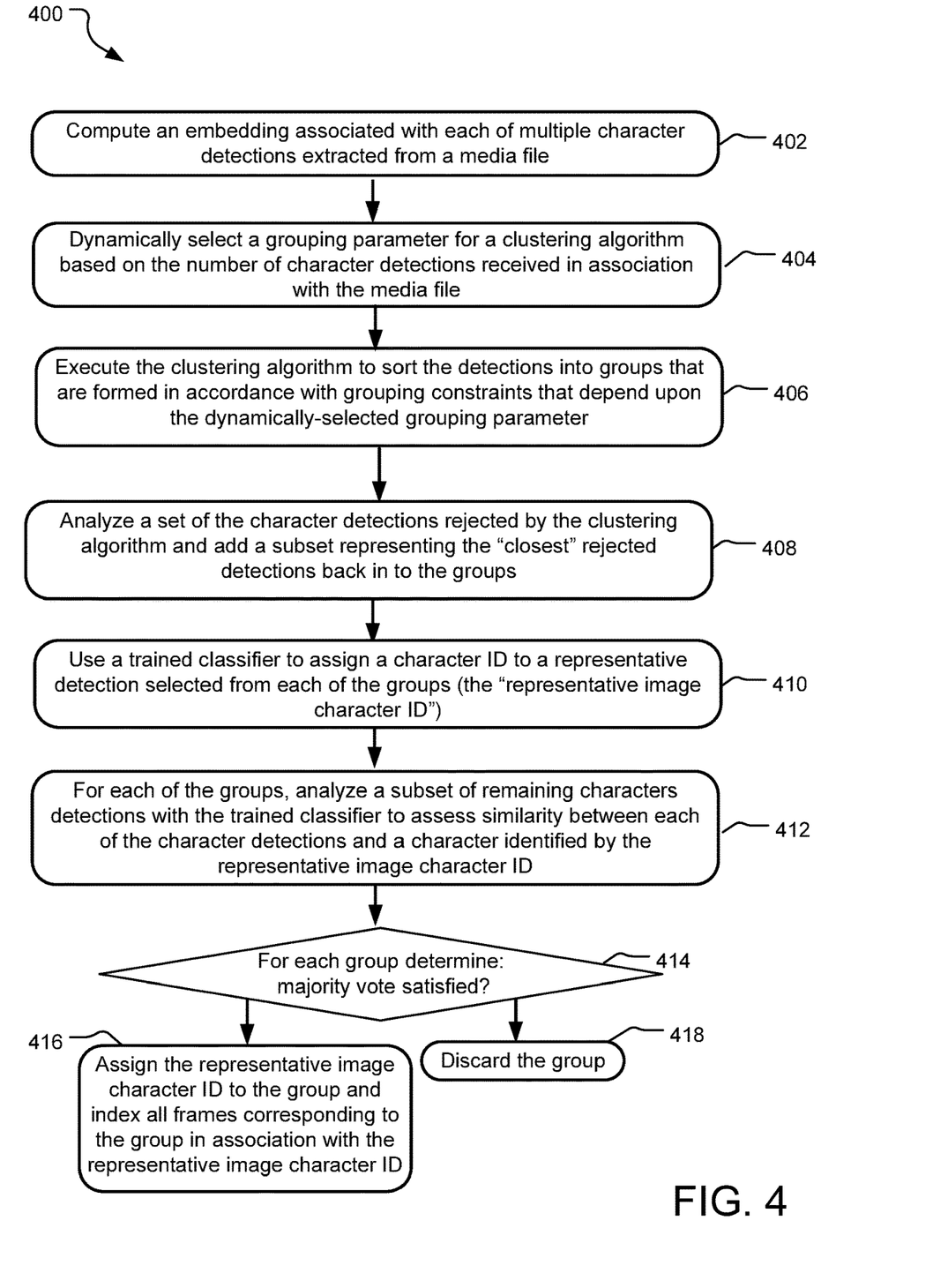
FIG. 4 illustrates example operations for indexing characters present in a different frames of a media file.

FIG. 4 illustrates example operations 400 for indexing characters present in a different frames of a media file. A computation operation 402 compute an embedding (e.g., multi-dimensional vector) associated with each of multiple character detections extracted from a media file. A dynamic grouping parameter selection operation 404 dynamically selects a grouping parameter based on the number of detections received in association with the media file. In one implementation, the grouping parameter represents a minimum group size and has a value that increases in proportion to the number of character detections identified within the media file. The grouping parameter is provided, along with the embeddings for the media file, to the clustering algorithm. An execution operation 406 executes the clustering algorithm, thereby sorting the detections into groups of like-detections (e.g., same character groups) that are formed in accordance with grouping constraints that depend upon the dynamically-selected grouping parameter. In one implementation, the grouping algorithm self-determines a number of groups to create based on the grouping parameter.

An analysis operation 408 analyzes the set of character detections rejected by the clustering algorithm to identify a subset of the detections that are visually the closest ("most similar" according to a predefined similarity metric) to an associated one of the groups. Each image within the identified subset of the detections is then added back into the associated closest one of the groups.

A classification operation 410 uses a trained classifier to assign a character ID to a representative image selected from each one of the groups. This character ID is referred to below as the "representative image character ID."

A analysis operation 412 analyzes a subset of remaining character detections within each group to assess the similarity between each detection and the character identified by the representative image character ID. A determination operation 414 determines whether, for each group, a majority of the detections satisfy a similarity threshold to the character identified by the representative image character ID. If not, the group remains without a character ID but may still indexed, such as with the label "unknown character" or other ambiguous identifier. If the determination operation 414 does determine that a majority of the detections satisfy the similarity threshold, the group of detections is assigned the character ID and all frames corresponding to the character detections in the group are indexed in association with the representative image character ID.

Figure 5:
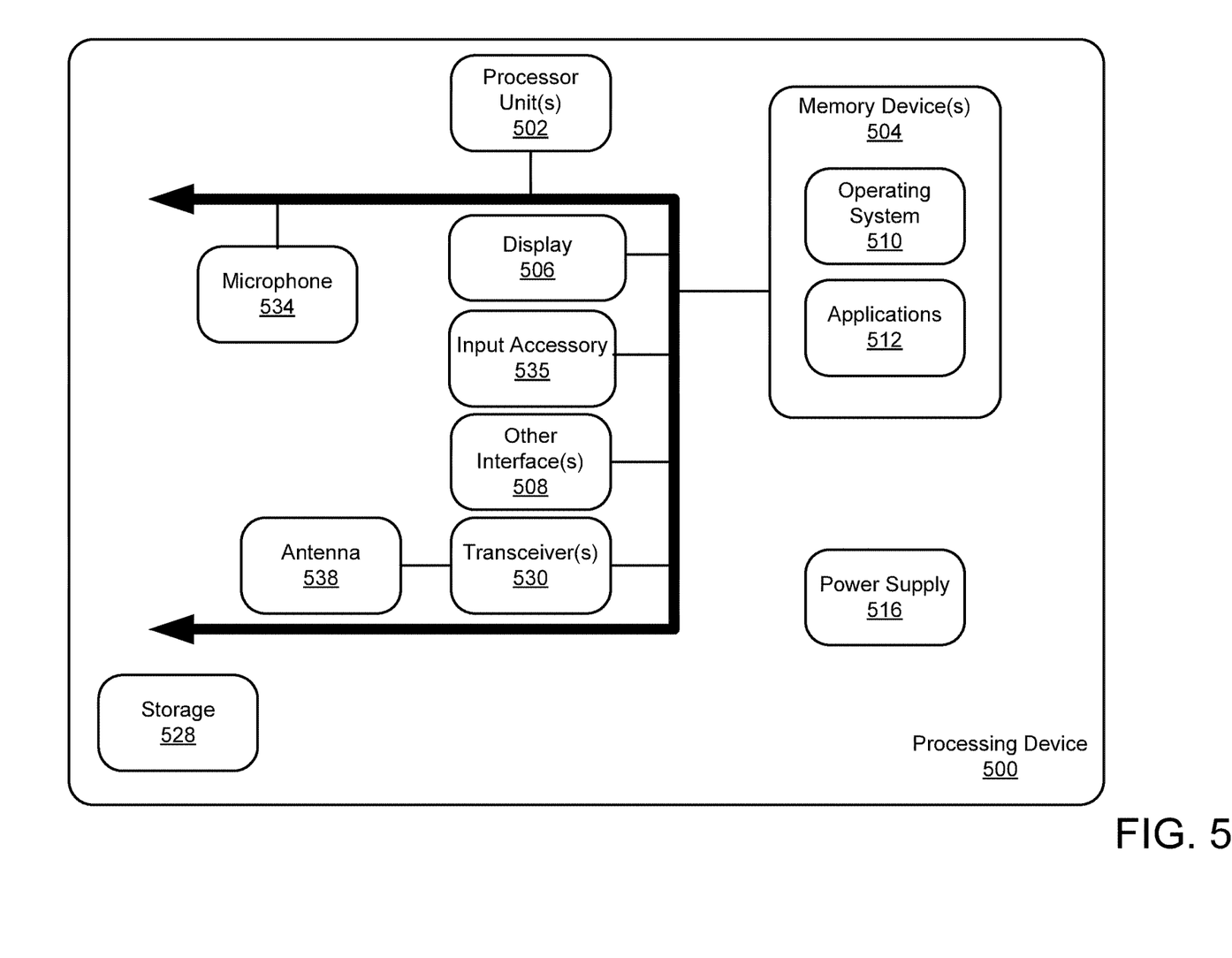
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The processor unit(s) 502 may include one or more CPUs, GPUs, and artificial intelligence (AI) accelerators (e.g., microchips designed to enable faster processing of AI tasks). In various implementations, the character indexing engine 104 of FIG. 1, character grouping engine 202 of FIG. 2, and/or the character recognition engine 320 of FIG. 3 embodied at least partially in software that is executed by the processing unit(s) 502.

The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as character indexing engine of FIG. 1 or any of its submodules are loaded in the memory 504 and executed on the operating system 510 by the processor unit(s) 602. The applications 512 may receive input from various input local devices such as a microphone 534, input accessory 535 (e.g., keypad, mouse, stylus, touchpad, gamepad, racing wheel, joystick), and a camera 532 (e.g., to provide the multiple object tracker with footage of a scene). Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The processing device 500 further includes a power supply 516, which is powered by one or more batteries or other power sources and which provides power to other components of the processing device 500. The power supply 616 may also be connected to an external power source (not shown) that overrides or recharges the built-in batteries or other power sources. In an example implementation, a character indexing engine may include hardware and/or software embodied by instructions stored in the memory 504 and/or the storage devices 528 and processed by the processor unit(s) 502. The memory 504 may be the memory of a host device or of an accessory that couples to the host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a character indexing engine configured to receive detections extracted from a media file that each correspond to a character and that each include an image extracted from a corresponding frame of the media file. For each one of the received detections, the character indexing engine determines an embedding defining a set of characteristics. The character indexing engine sets at least one grouping parameter based on a total number of the received detections, sorts the detections into groups using the grouping parameter and the embedding associated with each of the detections, assigns a character ID to each one of the groups of detections; and indexes the groups of detections in a database in association with the character ID assigned to the group.

In an example system according to any preceding system, the at least one grouping parameter includes a minimum cluster size that is set based on the total number of the detections for the media file, the minimum cluster size being smaller when the total number of the detections is smaller than when the total number of the detections is larger.

In another example system according to any preceding system, the at least one grouping parameter includes a minimum cluster size set based on the total number of the detections, the minimum cluster size being effective to limit the minimum cluster size to above a minimum threshold and below a maximum threshold.

In yet still another example system of any preceding system, the at least one grouping parameter includes a minimum cluster size set based on the total number of the detections for the media file. The character indexing engine is further configured to self-determine a number of total groups in which to sort the detections based on the minimum cluster size for the for the media file.

In still another example system of any preceding system, the character indexing engine is further executable to identify rejected detections that are excluded from the groups after an initial grouping operation and calculate a dissimilarity measure for each the rejected detections with respect to each one of the groups. The dissimilarity measure quantifies a mathematical separation between the embedding of each of the rejected detections and one or more of the embeddings associated with the group. The character indexing engine is configured to expand one or more of the groups to include a subset of the rejected detections for which the calculated dissimilarity measure satisfies a proximity condition.

In yet still another example system of any preceding system, the character indexing engine is further executable to calculate the dissimilarity measure by computing a set of linkage function values, each linkage function value of the set characterizing a separation between a select one of the rejected detections and an associated one of the groups.

In still another example system of any preceding system, the character indexing engine is further executable to assign the character ID to each one of the groups by performing a series of operations that includes: selecting a representative detection for the group; providing the representative detection as input to a character recognition engine, the character recognition engine trained to perform image classification to associate different images with different character IDs; receiving as output from the character recognition engine the character ID; providing multiple additional detections from the group to the character recognition engine; receiving as output from the character recognition engine a confidence value for each of the additional detections from the group, the confidence value representing a confidence that each respective one of the additional detections corresponds to the character ID; and assigning the group of detections to the character ID responsive to determining that the confidence values for the additional detections satisfy a predefined confidence standard.

In another example system of any preceding system, the predefined confidence standard is satisfied when the confidence value for a majority of the additional detections exceeds a threshold.

An example method disclosed herein provides for receiving detections extracted from a media file that each correspond to a detected instance of a character and include an image extracted from a corresponding frame of the media. The method further provides for determining, for each one of the received detections, an embedding defining a set of characteristics for the detected instance of the character; dynamically setting at least one grouping parameter based on a total number of the received detections; sorting the detections into groups using the grouping parameter and the embedding associated with each of the detections; assigning a character ID to each one of the groups of detections; and indexing the groups of detections in a database in association with the character ID assigned to the group.

In an example method according to any preceding method, the at least one grouping parameter includes a minimum cluster size that is set based on the total number of the received detections for the media file, the minimum cluster size being smaller when the total number of the received detections is smaller than when the total number of the received detections is larger.

In yet still another example method of any preceding method, the at least one grouping parameter includes a minimum cluster size set based on total number of the received detections for the media file. The minimum cluster size is effective to limit the minimum cluster size to above a minimum threshold and below a maximum threshold.

In another example method of any preceding method, the grouping parameter includes a minimum cluster size set based on a total number of the received detections for the media file. The character indexing engine is further configured to self-determine a number of total groups in which to sort the detections based on the minimum cluster size for the for the media file.

In still another example method of any preceding method, the method further comprises identifying a set of rejected detections that are excluded from the groups after an initial grouping operation, calculating a dissimilarity measure for each the rejected detections with respect to each one of the groups, and expanding one or more of the groups to include a subset of the rejected detections for which the calculated dissimilarity measure satisfies a proximity condition. The dissimilarity measure quantifies a mathematical separation between the embedding of each of the rejected detections and one or more of the embeddings associated with the group.

In yet still another example method of any preceding method, calculating the dissimilarity measure further comprises calculating the dissimilarity measure by computing a set of linkage function values. Each linkage function value of the set characterizes a separation between a select one of the rejected detections and an associated one of the groups.

In another example method of any preceding method, assigning the character ID further comprises selecting a representative detection for the group; providing the representative detection as input to a character recognition engine, the character recognition engine trained to perform image classification to associate different images with different character IDs; receiving as output from the character recognition engine the character ID; providing multiple additional detections from the group to the character recognition engine; receiving as output from the character recognition engine a confidence value for each of the additional detections from the group, the confidence value representing a confidence that each respective one of the additional detections corresponds to the character ID; and assigning the group of detections to the character ID responsive to determining that the confidence values for the additional detections satisfy a predefined confidence standard.

In yet another example method of any preceding method, the predefined confidence standard is satisfied when the confidence value returned for a majority of the additional detections exceeds a threshold.

An example computer-readable storage media disclosed herein stores computer-executable instructions for executing a computer process that comprises receiving detections extracted from a media file that each include an image extracted from a corresponding frame of the media file corresponds to a detected instance of a character. The process further comprises determining, for each one of the received detections, an embedding defining a set of characteristics for the detected instance of the character; dynamically setting at least one grouping parameter based on a total number of the received detections; sorting the detections into groups using the grouping parameter and the embedding associated with each one of the detections; assigning a character ID to each one of the groups of detections; and indexing the groups of detections in a database in association with the character ID assigned to the group.

In another example computer process of any preceding computer process, the at least one grouping parameter includes a minimum cluster size that is set based on total number of the detections received for the media file, the minimum cluster size being smaller when the total number of received detections is smaller than when the total number of received detections is larger.

In still yet another example computer process of any preceding computer process, the at least one grouping parameter includes a minimum cluster size set based on the total number of the detections received for the media file, the minimum cluster size being effective to limit the minimum cluster size to above a minimum threshold and below a maximum threshold.

In another example computer process of any preceding computer process, the at least one grouping parameter includes a minimum cluster size set based on the total number of the detections received for the media file, wherein the computer process selects a number of total groups in which to sort the detections based on the minimum cluster size for the for the media file.

An example system disclosed herein includes a means for receiving detections extracted from a media file that each correspond to a detected instance of a character and include an image extracted from a corresponding frame of the media. The system further includes a means for determining, for each one of the received detections, an embedding defining a set of characteristics for the detected instance of the character, and a means for dynamically setting at least one grouping parameter based on a total number of the received detections. The system still further provides a means for sorting the detections into groups using the grouping parameter and the embedding associated with each of the detections, a means for assigning a character ID to each one of the groups of detections; and a means for indexing the groups of detections in a database in association with the character ID assigned to the group.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
   memory; and
   a character indexing engine stored in the memory and executable to:
      receive detections extracted from a media file, each one of the detections including an image extracted from a corresponding frame of the media file that corresponds to a detected instance of a character;
      for each one of the received detections, determine an embedding defining a set of characteristics for the detected instance;
      dynamically set at least one grouping parameter based on a total number of the received detections; and
      sort the detections into groups using the grouping parameter and the embedding associated with each of the detections;
      assign a character ID to each one of the groups of detections; and
      index the groups of detections in a database in association with the character ID assigned to the group.

2. The system of claim 1, wherein the at least one grouping parameter includes a minimum cluster size that is set based on the total number of the detections for the media file, the minimum cluster size being smaller when the total number of the detections is smaller than when the total number of the detections is larger.

3. The system of claim 1, wherein the at least one grouping parameter includes a minimum cluster size set based on the total number of the detections, the minimum cluster size being effective to limit the minimum cluster size to above a minimum threshold and below a maximum threshold.

4. The system of claim 1, wherein the at least one grouping parameter includes a minimum cluster size set based on the total number of the detections for the media file, wherein the character indexing engine is further configured to self-determine a number of total groups in which to sort the detections based on the minimum cluster size for the for the media file.

5. The system of claim 1, wherein the character indexing engine is further executable to:
   identify rejected detections that are excluded from the groups after an initial grouping operation;
   calculate a dissimilarity measure for each the rejected detections with respect to each one of the groups, the dissimilarity measure quantifying a mathematical separation between the embedding of each of the rejected detections and one or more of the embeddings associated with the group; and
   expand one or more of the groups to include a subset of the rejected detections for which the calculated dissimilarity measure satisfies a proximity condition.

6. The system of claim 5, wherein the character indexing engine is further executable to calculate the dissimilarity measure by computing a set of linkage function values, each linkage function value of the set characterizing a separation between a select one of the rejected detections and an associated one of the groups.

7. The system of claim 1, wherein the character indexing engine is further executable to assign the character ID to each one of the groups by performing a series of operations comprising:
selecting a representative detection for the group;
providing the representative detection as input to a character recognition engine, the character recognition engine trained to perform image classification to associate different images with different character IDs;
receiving as output from the character recognition engine the character ID;
providing multiple additional detections from the group to the character recognition engine;
receiving as output from the character recognition engine a confidence value for each of the additional detections from the group, the confidence value representing a confidence that each respective one of the additional detections corresponds to the character ID;
assigning the group of detections to the character ID responsive to determining that the confidence values for the additional detections satisfy a predefined confidence standard.

8. The system of claim 7, wherein the predefined confidence standard is satisfied when the confidence value for a majority of the additional detections exceeds a threshold.

9. A method comprising:
receiving detections extracted from a media file, each one of the detections including an image extracted from a corresponding frame of the media file that corresponds to a detected instance of a character;
for each one of the received detections, determining an embedding defining a set of characteristics for the detected instance of the character;
dynamically setting at least one grouping parameter based on a total number of the received detections;
sorting the detections into groups using the grouping parameter and the embedding associated with each of the detections;
assigning a character ID to each one of the groups of detections; and
indexing the groups of detections in a database in association with the character ID assigned to the group.

10. The method of claim 9, wherein the at least one grouping parameter includes a minimum cluster size that is set based on the total number of the received detections for the media file, the minimum cluster size being smaller when the total number of the received detections is smaller than when the total number of the received detections is larger.

11. The method of claim 9, wherein the at least one grouping parameter includes a minimum cluster size set based on the total number of the received detections for the media file, the minimum cluster size being effective to limit the minimum cluster size to above a minimum threshold and below a maximum threshold.

12. The method of claim 9, wherein the at least one grouping parameter includes a minimum cluster size set based on total number of the received detections for the media file, wherein the character indexing engine is further configured to self-determine a number of total groups in which to sort the detections based on the minimum cluster size for the for the media file.

13. The method of claim 9, further comprising:
identifying a set of rejected detections that are excluded from the groups after an initial grouping operation;
calculating a dissimilarity measure for each the rejected detections with respect to each one of the groups, the dissimilarity measure quantifying a mathematical separation between the embedding of each of the rejected detections and one or more of the embeddings associated with the group; and
expanding one or more of the groups to include a subset of the rejected detections for which the calculated dissimilarity measure satisfies a proximity condition.

14. The method of claim 9, wherein calculating the dissimilarity measure further comprises:
calculating the dissimilarity measure by computing a set of linkage function values, each linkage function value of the set characterizing a separation between a select one of the rejected detections and an associated one of the groups.

15. The method of claim 9, wherein assigning the character ID further comprises:
selecting a representative detection for the group;
providing the representative detection as input to a character recognition engine, the character recognition engine trained to perform image classification to associate different images with different character IDs;
receiving as output from the character recognition engine the character ID;
providing multiple additional detections from the group to the character recognition engine;
receiving as output from the character recognition engine a confidence value for each of the additional detections from the group, the confidence value representing a confidence that each respective one of the additional detections corresponds to the character ID; and
assigning the group of detections to the character ID responsive to determining that the confidence values for the additional detections satisfy a predefined confidence standard.

16. The method of claim 15, wherein the predefined confidence standard is satisfied when the confidence value returned for a majority of the additional detections exceeds a threshold.

17. One or more tangible computer-readable storage media storing computer-executable instructions for executing a computer process, the computer process comprising:
receiving detections extracted from a media file, each one of the detections including an image extracted from a corresponding frame of the media file that corresponds to a detected instance of a character;
for each one of the received detections, determining an embedding defining a set of characteristics for the detected instance of the character;
dynamically setting at least one grouping parameter based on a total number of the received detections;
sorting the detections into groups using the grouping parameter and the embedding associated with each one of the detections;
assigning a character ID to each one of the groups of detections; and
indexing the groups of detections in a database in association with the character ID assigned to the group.

18. The one or more tangible computer-readable storage media of claim 17, wherein the at least one grouping parameter includes a minimum cluster size that is set based on total number of the detections received for the media file, the minimum cluster size being smaller when the total number of received detections is smaller than when the total number of received detections is larger.

19. The one or more tangible computer-readable storage media of claim 17, wherein the at least one grouping parameter includes a minimum cluster size set based on the total number of the detections received for the media file, the minimum cluster size being effective to limit the minimum cluster size to above a minimum threshold and below a maximum threshold.

20. The one or more tangible computer-readable storage media of claim 17, wherein the at least one grouping parameter includes a minimum cluster size set based on the total number of the detections received for the media file, wherein the computer process selects a number of total groups in which to sort the detections based on the minimum cluster size for the for the media file.

* * * * *